US008687887B2

(12) United States Patent
Norimatsu et al.

(10) Patent No.: US 8,687,887 B2
(45) Date of Patent: Apr. 1, 2014

(54) IMAGE PROCESSING METHOD, IMAGE PROCESSING APPARATUS, AND IMAGE PROCESSING PROGRAM

(75) Inventors: Masashi Norimatsu, Kanagawa-ken (JP); Yoshiro Imai, Kanagawa-ken (JP); Yukita Gotohda, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 922 days.

(21) Appl. No.: 12/416,437

(22) Filed: Apr. 1, 2009

(65) Prior Publication Data

US 2009/0245626 A1    Oct. 1, 2009

(30) Foreign Application Priority Data

Apr. 1, 2008    (JP) .................................. 2008-094500

(51) Int. Cl.
*G06K 9/36*    (2006.01)

(52) U.S. Cl.
USPC ........... 382/173; 382/164; 382/132; 382/199; 348/333.01; 348/333.02

(58) Field of Classification Search
USPC ......... 382/173, 199, 131, 128, 203, 260, 275, 382/133, 164, 132, 170, 305, 252, 130, 298, 382/160, 288, 159, 181, 190, 309, 285, 154, 382/300, 117, 120, 294, 224, 232, 100, 209, 382/149, 217, 218, 107, 104, 147; 348/333.12, 240.2, 333.01, 333.02, 348/222.1, 231.3, 213, 79, 39, 36, 120; 396/373, 374, 378, 213, 104, 289, 134, 396/130; 375/240.08, E07.075, 108; 600/437, 624, 595, 431, 407, 415, 425, 600/466, 462, 478, 416; 345/620, 629, 605
See application file for complete search history.

(56) References Cited

U.S. PATENT DOCUMENTS

| 6,476,821 B2 * | 11/2002 | Sawada et al. ................ 345/620 |
| 7,376,347 B2 | 5/2008 | Sugimoto |
| 8,576,309 B2 * | 11/2013 | Hashizume .................. 348/246 |

(Continued)

FOREIGN PATENT DOCUMENTS

| JP | 2001-236508 | 8/2001 |
| JP | 2004-228995 | 8/2004 |
| JP | 2005-318515 | 11/2005 |
| JP | 2006-013722 | 1/2006 |
| JP | 2006013722 A * | 1/2006 |
| JP | 2007-318393 | 12/2007 |

OTHER PUBLICATIONS

Laurent Itti, "Models of Bottom-Up and Top-Down Visual Attention", Ph.D Thesis, published in Jan. 11, 2000, Abstract, Chapters 1-2, pp. ii, v-vi and 1-36.*

(Continued)

*Primary Examiner* — Mekonen Bekele
(74) *Attorney, Agent, or Firm* — Young & Thompson

(57) ABSTRACT

A region of interest extracting section automatically extracts regions of interest from within original images by obtaining the degree by which the features of portions within the original images differ from the features of surrounding portions, based on the colors of the original images, brightnesses of the original images, and the orientations of linear components that appear in the original images. A partial image generating section generates partial images by cutting out images of predetermined sizes that include the regions of interest, which are extracted by the region of interest extracting section, from the original images. The generated partial images are displayed.

6 Claims, 9 Drawing Sheets

(56) References Cited

U.S. PATENT DOCUMENTS

| | | |
|---|---|---|
| 2003/0174890 A1* | 9/2003 | Yamauchi .................... 382/199 |
| 2005/0213801 A1* | 9/2005 | Ohara ........................... 382/132 |
| 2005/0219393 A1 | 10/2005 | Sugimoto |
| 2007/0024736 A1* | 2/2007 | Matsuda et al. ......... 348/333.12 |
| 2007/0220431 A1* | 9/2007 | Nakamura et al. ............ 715/716 |
| 2007/0242143 A1 | 10/2007 | Sugimoto |
| 2008/0024643 A1* | 1/2008 | Kato ........................ 348/333.01 |
| 2008/0062297 A1* | 3/2008 | Sako et al. ............... 348/333.02 |
| 2008/0292174 A1* | 11/2008 | Sato .............................. 382/132 |
| 2009/0245625 A1* | 10/2009 | Iwaki et al. ................... 382/159 |

OTHER PUBLICATIONS

Dirk Walther, "Interactions of Visual Attention and Object Recognition:Computational Modeling, Algorithms, and Psychophysics", Ph. D thesis, published on Mar. 7, 2006,Abstract, chapters 1 and 2: pp. iv-xi and 1-15.*

Japanese Official Action—2008-094500—Feb. 14, 2012.

* cited by examiner

DEGREE OF INTEREST
LOW ⟶ HIGH

DEGREE OF INTEREST
LOW ⟶ HIGH

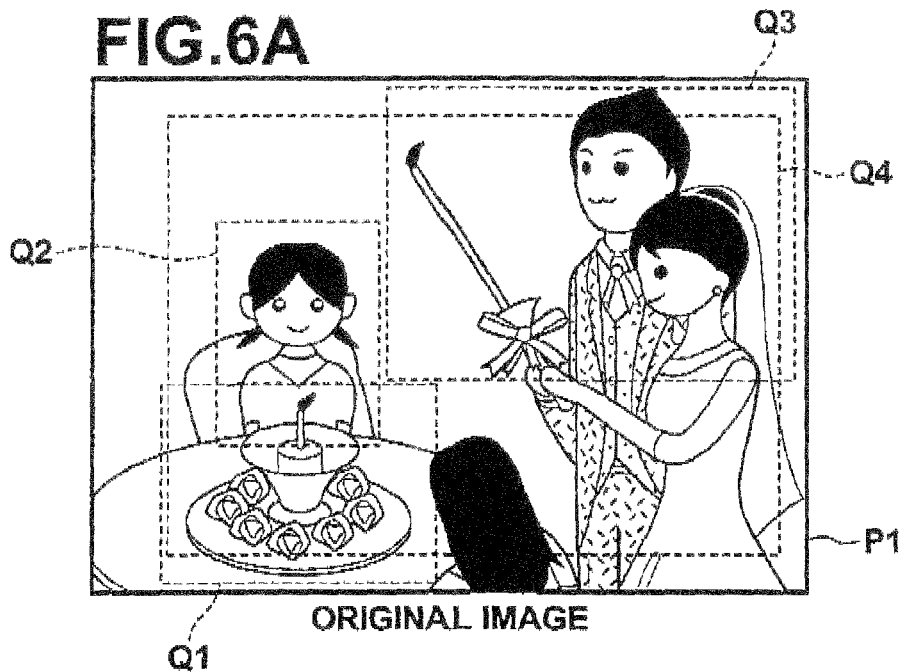
ORIGINAL IMAGE
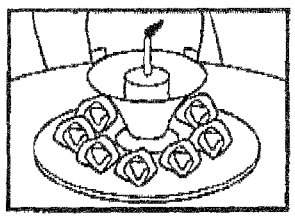
PARTIAL IMAGE Q1
PARTIAL IMAGE Q2
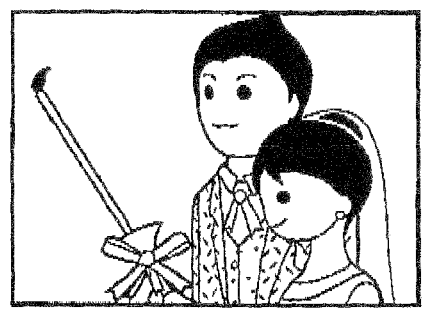
PARTIAL IMAGE Q3
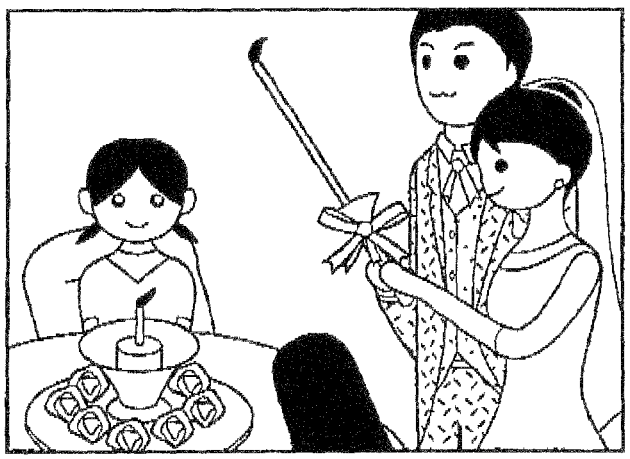
PARTIAL IMAGE Q4

IMAGE PROCESSING METHOD, IMAGE PROCESSING APPARATUS, AND IMAGE PROCESSING PROGRAM

BACKGROUND OF THE INVENTION

1. Field of the Invention

The present invention is related to an image processing method for generating partial images by cutting out images that include desired regions of interest from original images. The present invention is also related to image processing apparatus for executing the image processing method. Further, the present invention is related to a computer readable medium having a program stored therein that causes a computer to execute the image processing method.

2. Description of the Related Art

Works in which portions of photographs are cut out and pasted onto sheets along with text and illustrations are known. Recently, similar processing of digital images are being performed using personal computers.

Specifically, object portions, which are to be components of works to be created, are cutout as partial images from digital images. The partial images are generated by human visual recognition of object regions which are desired to be utilized as components of the works. However, selecting appropriate regions from a great number of images an extracting optimal object regions is an extremely time consuming process.

Therefore, a method has been proposed in which a detecting technique corresponding to objects specified to be cut out (for example, face detecting techniques in the case that the specified objects are human faces) are employed to automatically detect the specified objects (faces, for example) from images, the detected objects are cut out as independent images, and the cut out independent images are displayed on the monitor of a digital camera or the like (refer to Japanese Unexamined Patent Publication No. 2005-318515, for example).

However, in the case that a detector corresponding to the specified object is employed, only the objects which are the targets of detection of the detector can be extracted, even if there are other portions of the image that draw attention other than the specified objects. That is, the other portions of the image that are of interest cannot be extracted.

SUMMARY OF THE INVENTION

The present invention has been developed in view of the foregoing circumstances. It is an object of the present invention to provide an image processing method, an image processing apparatus, and an image processing program which are capable of displaying partial images, which are image portions of interest extracted from images.

An image processing apparatus according to the present invention is characterized by comprising;

an original image recording section, for recording original images;

a region of interest extracting section, for extracting regions of interest from within the original images, by obtaining the degree by which the features of portions within the original images differ from the features of surrounding portions, based on the colors of the original images, brightnesses of the original images, and the orientations of linear components that appear in the original images;

a partial image generating section, for generating partial images by cutting out images of predetermined sizes that include the regions of interest, which are extracted by the region of interest extracting section, from the original images; and a display section, for displaying the partial images, which are generated by the partial image generating section.

The term "regions of interest" refers to regions that draw attention visually. The term "regions of interest" also includes regions which are judged to have a high probability of drawing attention visually. It is often the case that regions having colors, brightnesses, and orientations of linear components which are different from those of the surrounding regions draw attention visually. Therefore regions having different colors, brightnesses, and orientations of linear components from those of the surrounding regions are extracted as the "regions of interest".

The phrase "cutting out images of predetermined sizes that include the regions of interest" refers to cutting out images that include at least a portion of the regions of interest. The images may also be cut out such that a single cutout image includes a plurality of regions of interest.

The image processing apparatus of the present invention may further comprise:

a command section, for selecting one of a plurality of generated partial images in cases that a plurality of generated partial images are generated, and for issuing a command to cause the selected partial image to be displayed by the display section.

A configuration may be adopted, wherein the "partial image generating section" generates the partial images based on the display resolution of the display section.

A configuration may be adopted, wherein the "region of interest extracting section" calculates the degrees of interest of the extracted regions of interest; and the "display section" displays the partial images that include the region of interest in descending order of the degrees of interest.

An image processing method according to the present invention is characterized by comprising the steps of:

recording original images;

extracting regions of interest from within the original images, by obtaining the degree by which the features of portions within the original images differ from the features of surrounding portions, based on the colors of the original images, brightnesses of the original images, and the orientations of linear components that appear in the original images;

generating partial images by cutting out images of predetermined sizes that include the extracted regions of interest from the original images; and displaying the generated partial images.

A computer readable medium according to the present invention is characterized by having a program recorded therein that causes a computer to execute an image processing method, comprising the procedures of:

recording original images;

extracting regions of interest from within the original images, by obtaining the degree by which the features of portions within the original images differ from the features of surrounding portions, based on the colors of the original images, brightnesses of the original images, and the orientations of linear components that appear in the original images;

generating partial images by cutting out images of predetermined sizes that include the extracted regions of interest from the original images; and displaying the generated partial images.

Those who are skilled in the art would know that computer readable media are not limited to any specific type of device, and include, but are not limited to: floppy disks, CD's, RAM's, ROM's, hard disks, magnetic tapes, and internet downloads, in which computer instructions can be store and/or transmitted. Transmission of the computer instructions through a network or through wireless transmission means is also within the scope of this invention. Additionally, computer instructions include, but are not limited to: source, object, and executable code, and can be in any language, including higher level languages, assembly language, and machine language.

The image processing apparatus of the present invention is equipped with the region of interest extracting section, for extracting regions of interest from within the original images, by obtaining the degree by which the features of portions within the original images differ from the features of surrounding portions, based on the colors of the original images, brightnesses of the original images, and the orientations of linear components that appear in the original images; and the partial image generating section, for generating partial images by cutting out images of predetermined sizes that include the regions of interest, which are extracted by the region of interest extracting section, from the original images. Therefore, partial images of various objects, which are not limited to specific objects, can be cut out and displayed.

A configuration may be adopted, wherein the partial images are generated based on the display resolution of the display section. In this case, the partial images which are cut out from the original images can be displayed such that visual recognition by viewers is facilitated.

BRIEF DESCRIPTION OF THE DRAWINGS

FIG. 6A is a diagram that illustrates a third example of an original image.

FIGS. 6B, 6C, 6D, and 6E are diagrams that illustrate examples of partial images.

BEST MODE FOR CARRYING OUT THE INVENTION

Figure 1:
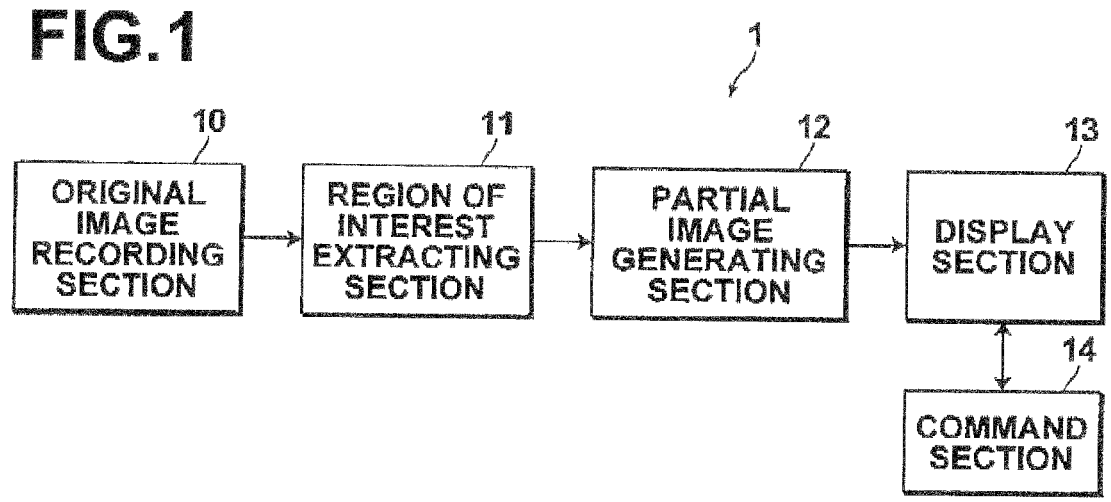
FIG. 1 is a diagram that illustrates the schematic construction of an image processing apparatus according to a first embodiment of the present invention.

Hereinafter, a first embodiment of the present invention will be described with reference to the attached drawings FIG. 1 is a diagram that illustrates the schematic construction of an image processing apparatus 1 according to the first embodiment of the present invention.

The image processing apparatus 1 is realized by executing an image processing program, which is read into an auxiliary memory device, on a computer (a workstation, for example). The image processing program is distributed by being recorded on recording media, such as CD-ROM's, or distributed via networks, such as the Internet, and stalled on the computer.

The image processing apparatus 1 is equipped with: an original image recording section 10, for recording original images P; a region of interest extracting section 11, for extracting regions of interest from within the original images P, by obtaining the degree by which the features of portions within the original images P differ from the features of surrounding portions, based on the colors of the original images P, brightnesses of the original images P, and the orientations of linear components that appear in the original images P; a partial image generating section 12, for generating partial images Q by cutting out images of predetermined sizes that include the regions of interest, which are extracted by the region of interest extracting section 11, from the original images; a display section 13, for displaying the partial images Q, which are generated by the partial image generating section 12; and a command section 14, for selecting one of a plurality of generated partial images Q in cases that a plurality of generated partial images Q are generated, and for issuing a command to cause the selected partial image Q to be displayed by the display section 13.

The original image recording section 10 is a high capacity memory apparatus such as a hard disk, or a recording medium which is connected to the image processing apparatus 1. A great number of photographed images obtained by digital still cameras and digital video cameras, or illustrated images generated by image generating software such as Illustrator are stored in the original image recording section 10 as original images P. Here, the original images P are still images. Hereinafter, the original images P will be described as being still images.

The region of interest extracting section 11 extracts portions of the original images P that draw attention when the original images P are viewed visually. Examples of portions of images that draw attention include: portions at which colors differ from the colors of surrounding portions; portions which are extremely bright compared to surrounding portions; and portions that include linear components within flat images. Therefore, the region of interest extracting section 11 obtains the degree by which the features of portions within the original images differ from the features of surrounding portions, based on the colors of the original images P, brightnesses of the original images P, and the orientations of linear components that appear in the original images P. Then, the region of interest extracting section 11 extracts portions that have great degrees of differences from surrounding portions thereof.

In this manner, the elements such as color, brightness, and linear components of regions of interest that draw visual attention have features different from the surrounding portions. Therefore, the colors, the intensities, and the orientations of linear components within the original images P are employed to obtain the degree by which the features of portions within the original images differ from the features of surrounding portions. Portions of images that have great degrees of differences from the surrounding portions thereof are considered to be regions of interest that draw attention visually. Specifically, the technique proposed by Itti et al. is employed to automatically extract regions of interest that draw attention visually (refer to L. Itti et al., "A Model of Saliency-Based Visual Action for Rapid Scene Analysis", IEEE TRANSACTIONS ON PATTERN ANALYSIS AND MACHINE INTELLIGENCE, Vol. 20, No. 11, pp. 1254-1259, 1998, for example).

Figure 2:
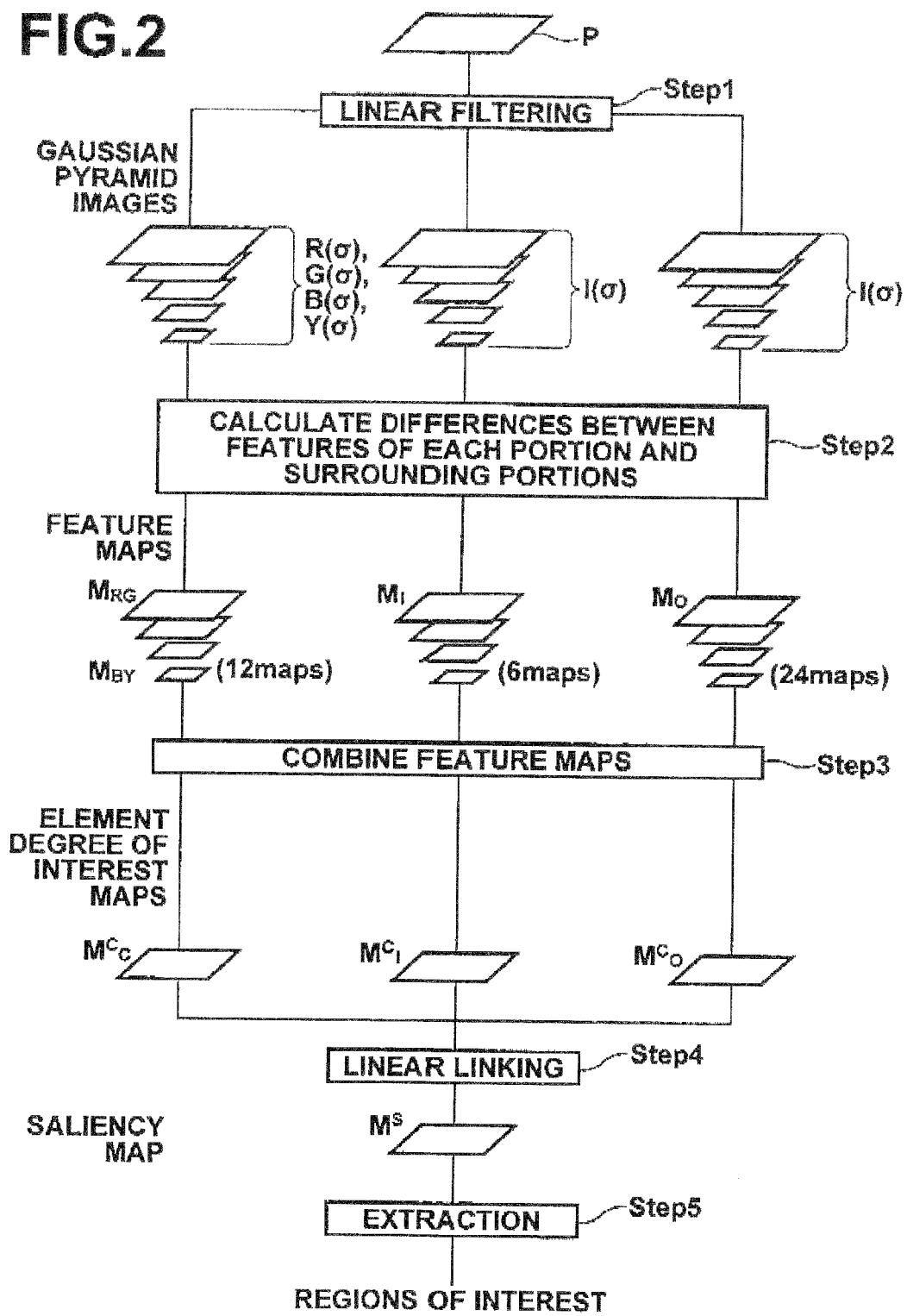
FIG. 2 is a diagram for explaining a method for extracting regions of interest.

The steps of a process for extracting regions of interest using this technique will be described with reference to FIG. 2.

First, a filtering process is administered onto an original image P to generate a brightness image I that represents brightness and a plurality of color component images, which are separated into a plurality of color components (Step 1).

Then, a Gaussian pyramid is generated from the brightness image I, which is generated from the original image P. Images of each layer of the Gaussian pyramid are designated as $I(\sigma)$ ($\sigma$ represents the scales of pixels, and $\sigma \in [0 \ldots 8]$).

Next, the original image P is divided into four color component images, R (red), G (green), B (blue), and Y (yellow). Further, Gaussian pyramids are generated for each of the color component images R, G, B, and Y. Images of each layer of the Gaussian pyramids are designated as $R(\sigma)$, $G(\sigma)$, $B(\sigma)$, and $Y(\sigma)$.

Thereafter, a feature map that represents to what degree the features of each portion of the original image P differs from the features of the surrounding portions thereof is generated from the images $I(\sigma)$, $R(\sigma)$, $G(\sigma)$, $B(\sigma)$, and $Y(\sigma)$ (step 2).

Locations within images at which the brightness of a portion is perceived to be different from the brightnesses of the surrounding portions thereof are locations at which a dark portion exists within bright surroundings, and locations at which a bright portion exists within dark surroundings. The degree of difference in brightness between a central portion and surrounding portions is obtained using an image I(c) having fine pixels, and an image I(s) having coarse pixels. The value of a single pixel within the coarse image I(s) represents a value of several pixels of the fine image I(c), which are organized. Therefore, the difference in the pixel value of a pixel within the image I(c) (the brightness value of a central portion) and the pixel value of a pixel within the image I(s) (the brightness of the surrounding portions) corresponding to the pixel is obtained (by the Center-Surround technique, for example). Thereby, the degrees of differences in brightness among portions and the surrounding portions thereof within an image can be derived. The scales of the images I(c) having fine pixels are designated as $c \in [2, 3, 4]$ the scales of the images I(s) having coarse pixels are designated as $s = c + \delta$ ($\delta \in [3, 4]$), and brightness feature maps $M_I(c, s)$ are obtained. The brightness feature maps $M_I(c, s)$ are represented by the following Formula (1).

$$M_I(c,s) = |I(e_c)I(s)| \quad (1)$$

wherein e is an operator that represents the difference between two images.

Feature maps are generated for the color component images $R(\sigma)$, $G(\sigma)$, $B(\sigma)$, and $Y(\sigma)$ as well, in a similar manner. Locations within images at which the color of a portion is perceived to be different from the colors of the surrounding portions thereof can be found from combinations of opposing colors, which are colors positioned at opposite positions along the color circle. For example, a feature map $M_{RG}(c, s)$ is obtained from combinations of red/green and green/red, and a feature map $M_{BY}(c, s)$ is obtained from combinations of blue/yellow and yellow/blue. These color feature maps are represented by the following Formulas (2) and (3).

$$M_{RG}(c,s) = |(R(c)-G(e_c))(G(s)-R(s))| \quad (2)$$

$$M_{BY}(c,s) = |(B(c)-Y(e_c))(Y(s)-B(s))| \quad (3)$$

Further, locations within images at which the orientations of linear components that appear in the images are perceived to be different from the orientations of linear components that appear in the surrounding portions thereof can be found by utilizing a Gabor filter or the like to detect the orientations of linear components within the brightness image I. The Gabor filter is employed to detect linear components in each direction $\theta \in [0°, 45°, 99°, 135°]$ from the brightness images $I(\sigma)$ of each layer, to obtain orientation feature maps $M_O(c, s, \theta)$. The orientation feature maps $M_O(c, s, \theta)$ are represented by the following Formula (4).

$$M_O(c,s,\theta) = |M_O(c, \ominus \theta) M_O(s, \theta)| \quad (4)$$

In the case that $c \in [2, 3, 4]$ and $s = c + \delta$ ($\delta \in [3, 4]$), 6 brightness feature maps, 12 color feature maps, and 24 orientation feature maps are obtained. These maps are viewed comprehensively, and regions of interest that draw attention visually are extracted.

Among the 42 feature maps $M_I$, $M_{RG}$, $M_{BY}$, and $M_O$, there are those in which differences between portions and the surrounding portions thereof appear greatly and those in which differences between portions and the surrounding portions thereof do not appear greatly. This is due to differences in dynamic ranges and differences in data which is extracted. For this reason, if the 42 feature maps $M_I$, $M_{RG}$, $M_{BY}$, and $M_O$ are employed as is, there will be cases in which data from the feature maps in which the differences are small will not be reflected in the results of judgment, due to influence of the feature maps in which the differences are great. Therefore, it is preferable for the 42 feature maps $M_I$, $M_{RG}$, $M_{BY}$, and $M_O$ to be combined after being normalized, to extract the regions of interest.

Specifically, the six brightness feature maps $M_I(c, s)$ are normalized and combined to obtain a brightness element saliency map $M^C_I$, the 12 color feature maps $M_{RG}(c, s)$ and $M_{BY}(c, s)$ are also normalized and combined to obtain a color element saliency map $M^C_C$, and the 24 orientation feature maps $M_O(c, s, \theta)$ are normalized and combined to obtain an orientation element saliency map $M^C_O$, for example (step 3). Further, the element saliency maps $M^C_I$, $M^C_C$, and $M^C_O$ are linearly linked to obtain a saliency map $M^S$ that represents the distribution of degrees of interest of each portion of the original image P (step 4). Regions at which the degree of interest exceeds a predetermined threshold value are extracted as regions of interest (step 5).

In addition, the weighting of each of the degrees of interest in the color, the brightness, and the orientations of the linear components of the original image P can be changed. The changes in weighting will change the influence that the degree of interest in the color, the brightness, and the orientations of the linear components of the original image P will exert during extraction of the regions of interest, and thereby, the regions of interest to be extracted can be changed. For example, by changing the weightings of the element saliency maps $M^C_I$, $M^C_C$, and $M^C_O$ when they are linearly linked, regions of interest ROI which are extracted can be changed. Alternatively, the weighting of each of the feature maps $M_I(c, s)$, $M_{RG}(c, s)$, $M_{BY}(c, s)$, and $M_O(c, s, \theta)$ may be changed such that the influences exerted thereby on the element saliency maps $M^C_I$, $M^C_C$, and $M^C_O$ are changed.

In addition, the region of interest extracting section 11 may be further equipped with an object type judging section (not shown).

The object type judging section analyzes the type of objects (landscapes, night scenes, ground, ocean, snow, mountains, flowers, sunsets, parties, people (including faces), babies, sports, pets, fish, buildings, etc.) within the original images P, based on the original images P.

The method disclosed in Japanese Unexamined Patent Publication No. 2005-310123 (hereinafter, referred to as "Reference Document 1") may be employed by the object type judging section of the image processing apparatus of the present invention to analyze objects. The method of Reference Document 1 employs a plurality of classifiers for selecting specified objects that consider trends in the arrangements of characteristic portions corresponding to desired specified objects within original images, and also consider the positions of the objects in the original images, ratios of areas of the objects with respect to the areas of original images, and changes therein. The specified objects are recognized by a threshold value of a specific classifier, or by the sum of a plurality of threshold values. Note that degrees of reliability that an object is the specified object can be calculated from the threshold value of a specific classifier, or by the sum of a plurality of threshold values.

Alternatively, the method disclosed in Japanese Unexamined Patent Publication No. 2005-122720 (hereinafter, referred to as "Reference Document 2") may be employed by the image processing apparatus of the present invention. In the method of Reference Document 2, reference data, in which types of features and discrimination conditions are normalized for each of a plurality of objects to be specified, are stored in a memory. All of the features which are employed to discriminate a plurality of objects that may be specified as the specified objects are derived from original images. Types of features defined in the reference data are referred to, according to specified objects, and the features are derived from the original images. The discriminating conditions within the reference data are referred to based on the derived features, and whether images of the specified object are included in the original images is judged based on whether the features exceed predetermined threshold values.

In addition, degrees of reliability that an object is the specified object can be calculated from the threshold values and the discriminating conditions.

Further, the object type judging section may detect human faces from within original images P. Specifically, the object type judging section may detect regions having the features included in faces (such as skin color, eyes, the shape of a face) as face regions.

The method disclosed in Japanese Unexamined Patent Publication No. 2006-202276 (hereinafter, referred to as "Reference Document 3") may be employed by the image processing apparatus of the preset invention, for example. In the method of Reference Document 3, known techniques such as movement vectors and feature detection, or a machine learning technique based on Adaboost is utilized to track faces. Adaboost is a technique in which learning data is continuously renewed at each re-sampling operation, to create machines, then the machines are weighted and combined to form an integrated learning machine. For example, an average frame model may be fitted into an actual image of a face within an original image P, and the positions of landmarks (eyes and mouth, for example) within the average frame model may be moved to match the positions of corresponding landmarks which have been detected in the image of the face, thereby deforming the average frame model to construct a frame model of the face. Classifiers and classifying conditions or each landmark are obtained by learning brightness profiles of points within a plurality of sample images, which are known to be of predetermined landmarks, and brightness profiles of points within a plurality of sample images, which are known not to be of predetermined landmarks. The classifiers and classifying conditions are employed to detect points within the image of the face that represent the landmarks.

In addition, degrees of reliability that an object is the specified object can be calculated from the discriminating conditions.

Alternatively, the method disclosed in Japanese Unexamined Patent Publication No. 2004-334836 (hereinafter, referred to as Reference Document 4) may be employed. The method of Reference Document 4 utilizes a characteristic portion extraction technique, in which: image data sets of a predetermined size are cut out from an original image P; wad each cut out image data set is compared against image data sets representing characteristic portions; to detect whether images of characteristic portions are present within the target image. Note that faces of animals may also be detected from through the lens images data as specific subjects in addition to human faces, as disclosed in Japanese Unexamined Patent Publication No. 2007-011970.

The aforementioned face detecting methods are not limited to detecting only forward facing faces, and faces in profile may also be detected.

The region of interest extracting section 11 may calculate new degrees of interest, based on the degrees of reliability calculated by the object type judging section and the aforementioned degrees of interest For example, a new degree of interest may be calculated as an average value of a degree of reliability and a degree of interest. Alternatively, a new degree of interest may be calculated as a value in which a degree of reliability and a degree of interest are combined at a predetermined ratio.

The partial image generating section 12 cuts out portions of original images P that include the regions of interest as partial images Q. The size of the images to be cut out is determined according to the image size of the partial images Q, and the resolution capable of being displayed by the display section 13. For example, in the case that the partial images Q are prepared as 150 pixel by 150 pixel images, images of is 150 pixel by 150 pixel sizes that include the regions of interest are cut out from the original images P as the partial images Q. It is preferable for various regions of interest to be extracted, while varying the influence that each of the color, the brightness, and the orientation of linear components of the original images P exerts on the extraction.

The partial image generating section 12 may cut out the partial images Q that correspond to the aforementioned degrees of interest or the aforementioned new degrees of interest in descending order from the highest degree of interest or the highest new degree of interest.

The partial image generating section 12 may cut out the partial images Q in order from those that include regions of interest positioned toward the appear left of the original images P to those that include regions of interest positioned toward the lower right of the original images P.

The partial image generating section 12 may cut out the partial images Q in order from those that include regions of interest positioned at the centers of the original images P to those that include regions of interest positioned toward the peripheries of the original images P.

The partial image generating section 12 may cut out the partial images Q in order from those that include faces as judged by the object type judging section, or those that include other regions of interest.

Note that the partial image generating section 12 is not limited to cutting out partial images Q as rectangular images. The command section 14 may set a deformable freeform frame, and the partial images Q may be cut out in the shape of the frame.

Optimal shapes for frames corresponding to objects which have been identified by the object type judging section may be stored in the partial image generating section 14. In this case, the partial image generating section 14 may cut out partial images Q in the shapes of the frames corresponding to the identified objects.

The partial image generating section 12 may adjust display areas to display range and resolution settings prescribed by the display section 13.

As described previously, the display section 13 displays the partial images Q. Examples of the display section 13 include CRT monitors and liquid crystal display monitors. In the case that the image processing apparatus 1 is built into a printer or a digital camera, the monitor of the printer or the digital camera may function as the display section 13.

Alternatively, in the case that the image processing apparatus 1 is built into a cellular telephone, the monitor of the cellular telephone may function as the display section 13.

As a further alternative, in the case that the image processing apparatus 1 is built into a computer, an external monitor which is connected to the computer may function as the display section 13.

The display section may display the partial images Q in descending order from the highest degree of interest or the highest new degree of interest of the regions of interest included therein.

The aforementioned command section 14 enables setting of the size of the images which are cut out by the partial image generating section 12, and also enables switching of display among the original images P and the partial images Q.

Figure 3:
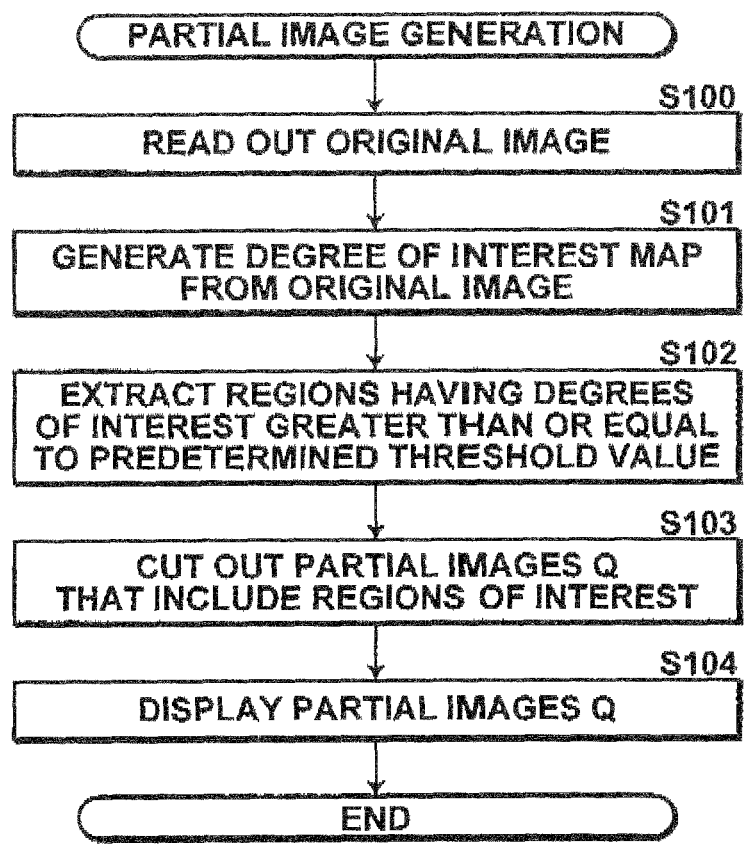
FIG. 3 is a flow chart that illustrates the steps of a process for extracting regions of interest from original image.

Next, the steps of the process performed by the image processing apparatus 1 of the present invention to generate and display the partial images Q will be described with reference to the flow chart of FIG. 3.

First, the image processing apparatus 1 reads out original images P, such as photographed images and illustrated images, and temporarily stores them in a hard disk (the original image recording section 10) (step S100).

The region of interest extracting section 11 generates an image I that represents brightness, and images R, G, B, and Y for each color component from an original image P which is stored in the hard disk. Gaussian pyramid images $I(\sigma)$, $R(\sigma)$, $G(\sigma)$, $B(\sigma)$, and $Y(\sigma)$ are generated from the images I, R, G, B, and Y. The Gaussian pyramid images are employed to generate a saliency map $M^S$, in which the saliency of each portion of the original image P is calculated, based on the colors, the brightnesses, and the orientations of linear components within the original image P (step S101). Regions at which the degree of interest in the saliency map $M^S$ is greater than or equal to a predetermined threshold value are extracted as regions of interest (step S102).

Figure 4A:
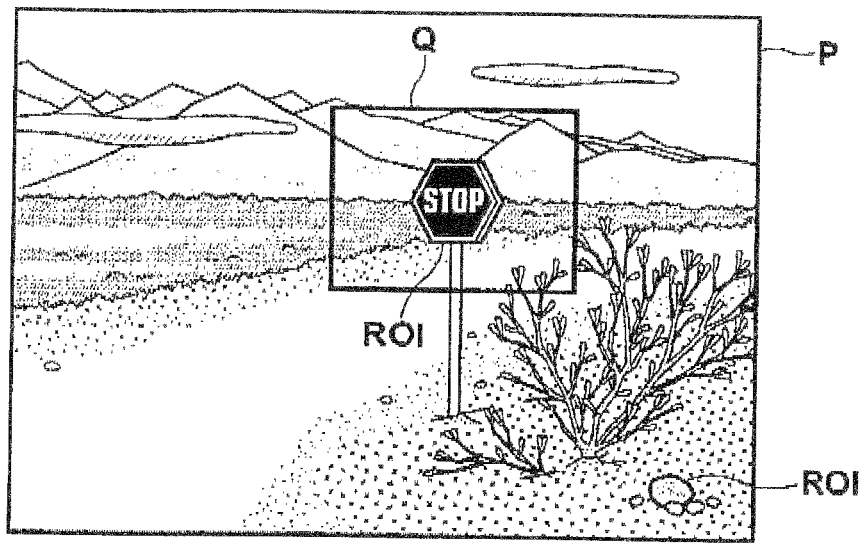
FIG. 4A is a diagram that illustrates a first example of an original image.
Figure 4B:
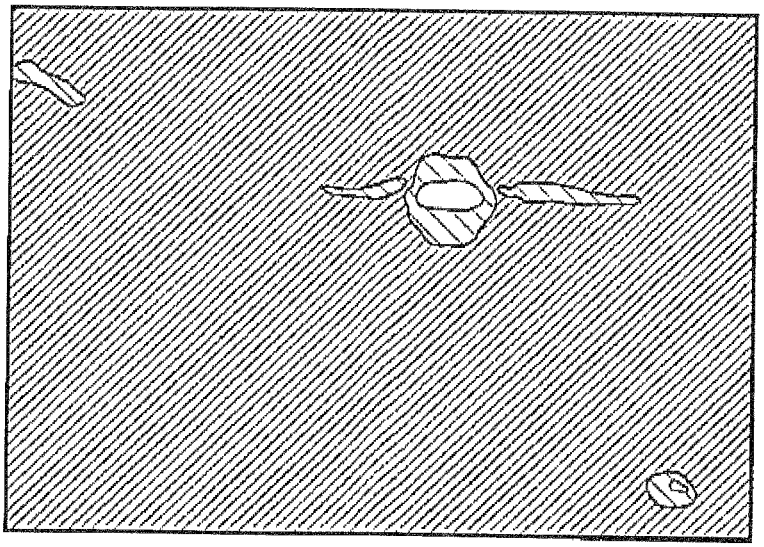
FIG. 4B is a diagram that illustrates a first example of a saliency map.
Figure 5A:
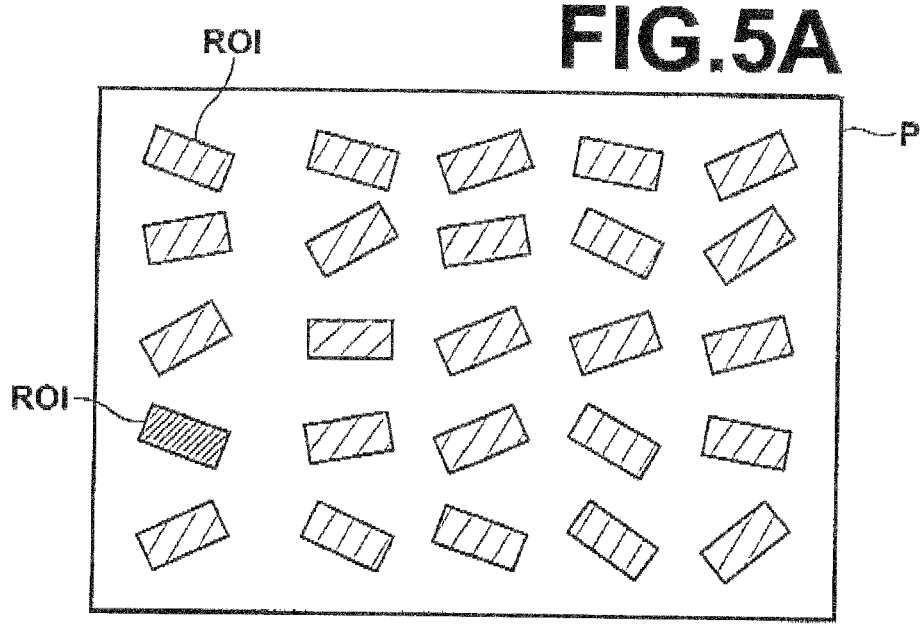
FIG. 5A is a diagram that illustrates a second example of an original image.
Figure 5B:
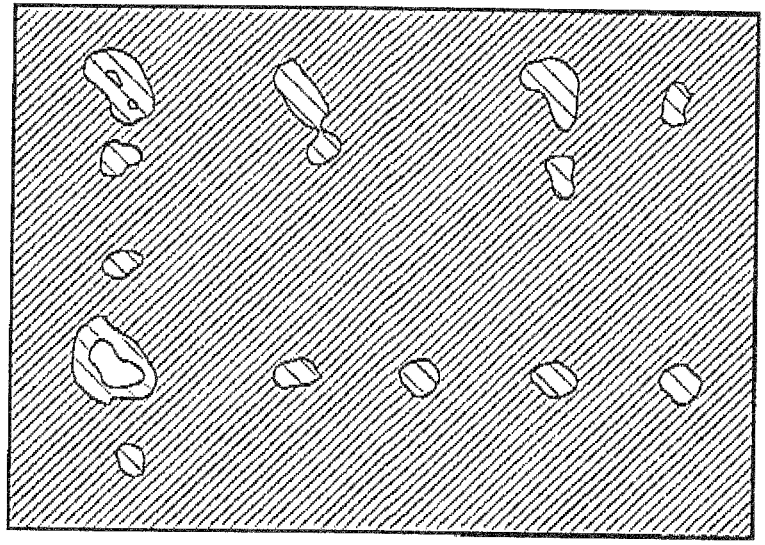
FIG. 5B is a diagram that illustrates a second example of a saliency map.

For example, in an image in which a red road sign is photographed the vicinity of the center thereof as illustrated in FIG. 4A, the mountains and the road at the periphery of the image are brown to gray in color. The color of the road sign differs greatly from the colors of the surrounding portions, and therefore the degree of interest in the saliency map $M^S$ becomes high. Therefore, the portions of the image at which the degree of interest is greater than or equal to the predetermined threshold value are extracted as regions of interest ROI, as illustrated in FIG. 4B. In the case that a single red rectangle is arranged with in a great number of green rectangles which are oriented in various directions as illustrated in FIG. 5A, the degree of interest becomes high at the portion of the red rectangle and at portions in which the orientations of the green rectangles are more inclined than those of the other rectangles. Therefore, these regions having high degrees of interest are extracted as regions of interest ROI, as illustrated in FIG. 5B.

The partial image generating section 12 cuts out rectangular regions that include the regions of interest ROI as partial images Q (step S103). The partial images Q are displayed by the display section 13 (step S104). The sizes of the partial images Q and the positions of the regions of interest ROI within the partial images Q need not be constant. In addition, partial images Q of various sizes that include the same region of interest ROI may also be generated. The portions of the original image P that include the regions of interest ROI are cut out as the partial images Q in this manner.

New degrees of interest may be set from the degrees of reliability calculated by the object type judging section and the aforementioned degrees of interest. The regions of interest may be calculated based on the set new degrees of interest.

An example in which sections surrounded by rectangular frames are cut out as partial images Q in the case of an image illustrated in FIG. 6A will be described.

FIG. 6A is a photograph of a candle service at a wedding reception. It is possible to employ the new degrees of interest to cut out partial images Q as illustrated in FIGS. 6G, 6C, 6D, and 6E.

Further, the partial images Q that include regions of interest ROI and objects having high degrees of interest/high new degrees of interest within the saliency map $M^S$ may be displayed by the display section 13 in descending order from the highest degree of interest/highest new degree of interest, or in the order that they are cut out as described above.

Display may be switched among partial images Q by input of commands from the command section 14 as necessary. The partial images Q may be displayed such that they move across a display region. Alternatively, display may be switched among partial images Q by magnifying and reducing the partial images Q using a zoom function or the like.

As a further alternative, special effect display, such as fade out/fade in, scrolling, and other dynamic switching methods may be employed to switch display among the partial images Q.

Users will be able to understand the composition of the entire original image P by performing the switching display described above.

Figure 7A:
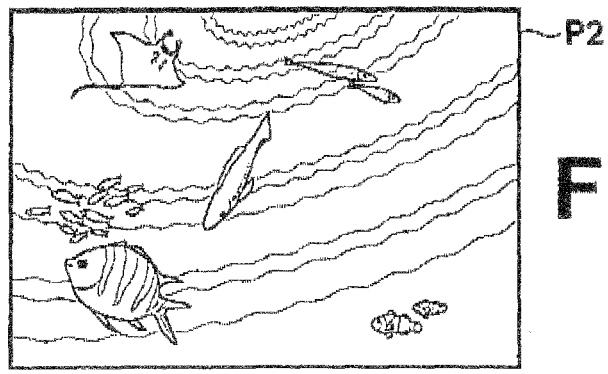
FIG. 7A is a diagram that illustrates a fourth example of an original image.
Figure 7B:
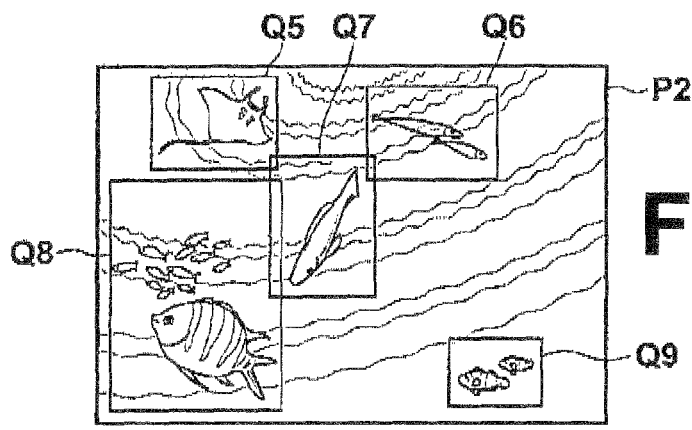
FIG. 7B is a diagram that illustrates examples of partial images.

FIG. 7A is another example of an original image P, obtained by photography while scuba diving. In this example, the regions (Q5 through Q9) surrounded by rectangles as illustrated in FIG. 7B may be cut out as partial images Q, by displaying regions of interest based on the degrees of interest/ the new degrees of interest.

Figure 7C:
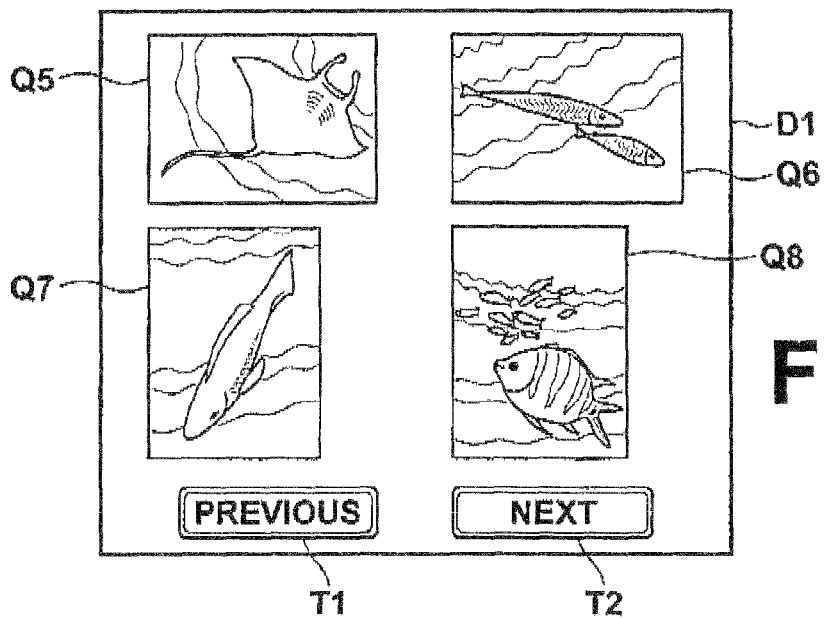
FIG. 7C is a diagram that illustrates an example of a display screen.

The command section 14 may be constituted by two strokes. The first stroke enables input of commands to switch display of trimmed regions. For example, the command section enables partial images Q of a set previous to or following those which are currently being displayed (Q5 through Q8) on a screen D1 of the display section 13 as illustrated in FIG. 7C, by pressing T1 or T2 displayed on the screen D1.

When display of all partial images Q generated by the partial image generating section 12 is complete, the command section 14 enables input of a command to display a next original image P with the second stroke.

Figure 8A:
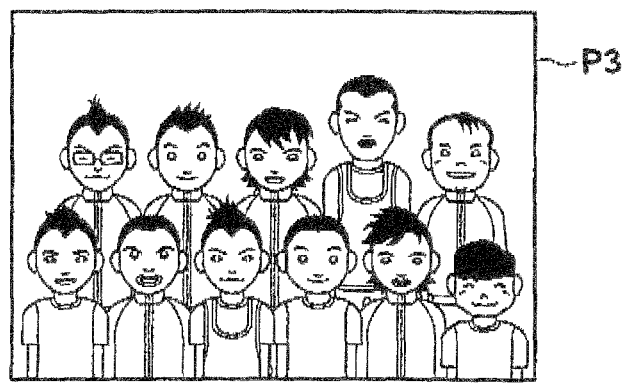
FIG. 8A is a diagram that illustrates a fifth example of an original image.
Figure 8B:
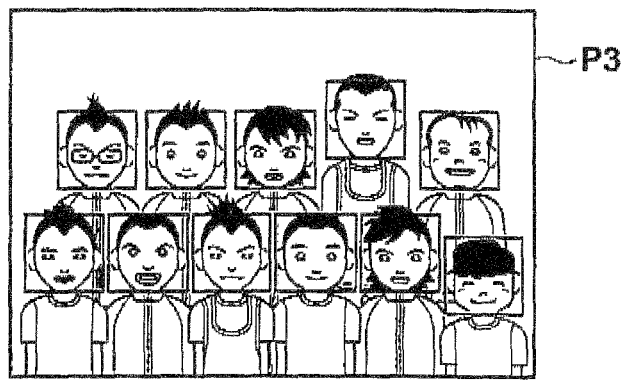
FIG. 8B is a diagram that illustrates examples of partial images.

FIG. 8A is still another example of an original image P, which is a photograph of a group of people. In this example, the new degrees of interest, in which weighting is performed so as to emphasize the degree of reliability calculated by the object type judging section, are used. Thereby, a plurality of regions which are surrounded by rectangular frames as illustrated in FIG. 8B can be cut out as partial images Q.

Figure 8C:
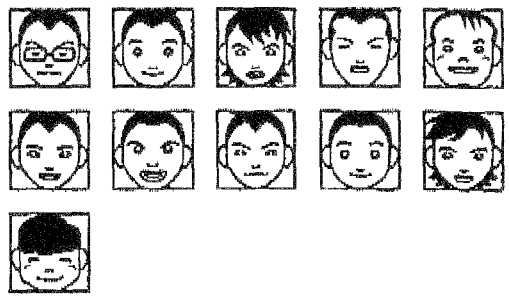
FIG. 8C is a diagram that illustrates a first example of a display screen, in which only partial images are displayed.
Figure 9:
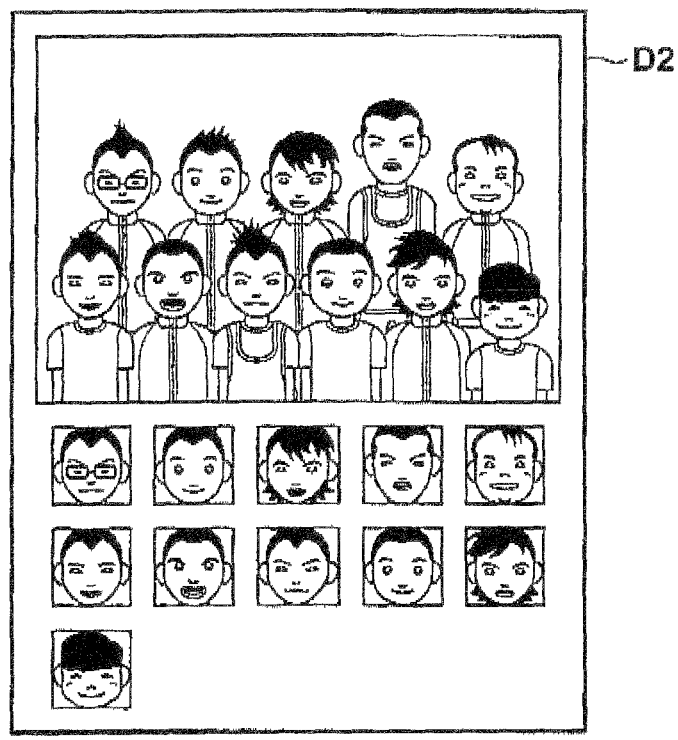
FIG. 9 is a diagram that illustrates a second example of a display screen.

As illustrated in FIG. 8C, because emphasis is placed on the degree of reliability calculated by the object type judging section, faces of people can be cut out without exception.

In the case that the display section 13 is small, such as the monitor of a cellular telephone, or the display resolution is low, the partial images Q illustrated in FIG. 8C may be sequentially displayed. In this case, even in the case that an original image is a photograph of a group of people including a great number of people photographed from afar, users will be able visually recognize who is pictured when viewing the display section 13.

In the case that a monitor D2 of the display section 13 is large, or the display resolution of the monitor D2 is high, the original image P and the partial images Q may be displayed simultaneously.

As described above, the image processing apparatus of the present invention is equipped with the region of interest extracting section 11, for extracting regions of interest from within original images P, by obtaining the degree by which the features of portions within the original images P differ from the features of surrounding portions, based on the colors of the original images P, brightnesses of the original images P, and the orientations of linear components that appear in the original images P; and the partial image generating section 12, for generating partial images Q by cutting out images of predetermined sizes that include the regions of interest, which are extracted by the region of interest extracting section 11, from the original images P. Therefore, partial images Q of various objects, which are not limited to specific objects, can be cut out from the original images P.

The region of interest extracting means 11 employs the object type judging section, and partial images Q that include detected objects as well as partial images Q that include regions of interest are both displayed by the display section 13. Thereby, users can visually recognize portions of images that draw attention, in addition to portions of images that include the specified objects. Therefore, the composition of the entireties of the original images P can be understood.

A configuration may be adopted, wherein the partial images Q are generated based on the display resolution of the display section 13. In this case, the partial images Q which are cut out from the original images can be displayed such that visual recognition by viewers is facilitated.

As described in detail above, regions of interest that draw attention visually are extracted from original images based on colors, brightnesses, and the orientations of linear components therein. Images that include the regions of interest are cut out as partial images. Thereby, partial images of various objects and regions of interest can be generated and displayed.

What is claimed is:

1. An image processing apparatus, comprising:
    an original image recording section, for recording original images;
    a region of interest extracting section, for extracting regions of interest from within the original images, the regions of interest being regions at which new degrees of interest exceed a predetermined threshold value, wherein the region of interest extracting section calculates the new degrees of interest as a value which is obtained from combining, at a predetermined ratio, a degree of interest and a degree of reliability that a specified object is included in the original images, the degree of interest being obtained from a combination of the degrees to which the features of portions within the original images differ from the features of surrounding portions, based on the colors of the original images, brightnesses of the original images, and the orientations of linear components that appear in the original images;
    a partial image generating section, for generating partial images by cutting out images of predetermined sizes that include the regions of interest, which are extracted by the region of interest extracting section, from the original images; and
    a display section, for displaying the partial images, which are generated by the partial image generating section.

2. An image processing apparatus as defined in claim 1, further comprising:
    a command section, for selecting one of a plurality of generated partial images in cases that a plurality of generated partial images are generated, and for issuing a command to cause the selected partial image to be displayed by the display section.

3. An image processing apparatus as defined in claim 2, wherein:
    the partial image generating section generates the partial images based on the display resolution of the display section.

4. An image processing apparatus as defined in claim 3, wherein:
    the display section displays the partial images that include the region of interest in descending order of the new degrees of interest.

5. An image processing method, comprising the steps of:
    recording original images;
    obtaining a degree of interest from a combination of the degrees to which the features of portions within the original images differ from the features of surrounding portions, based on the colors of the original images, brightnesses of the original images, and the orientations of linear components that appear in the original images;
    calculating new degrees of interest as a value which is obtained from combining, at a predetermined ratio, the degree of interest and a degree of reliability that a specified object is included in the original images;
    extracting regions of interest from within the original images, the regions of interest being regions at which the new degrees of interest exceed a predetermined threshold value;
    generating partial images by cutting out images of predetermined sizes that include the extracted regions of interest from the original images; and
    displaying the generated partial images.

6. A non-transitory computer readable medium having recorded therein a program that causes a computer to execute an image processing method, comprising the procedures of:
    recording original images;
    obtaining a degree of interest from a combination of the degrees to which the features of portions within the original images differ from the features of surrounding portions, based on the colors of the original images, brightnesses of the original images, and the orientations of linear components that appear in the original images;
    calculating new degrees of interest as a value which is obtained from combining, at a predetermined ratio, the degree of interest and a degree of reliability that a specified object is included in the original images;

extracting regions of interest from within the original images, the regions of interest being regions at which the new degrees of interest exceed a predetermined threshold value;
generating partial images by cutting out images of predetermined sizes that include the extracted regions of interest from the original images; and
displaying the generated partial images.

\* \* \* \* \*